United States Patent
Bystedt

(10) Patent No.: US 11,396,233 B2
(45) Date of Patent: Jul. 26, 2022

(54) SYSTEM AND ARRANGEMENT AT AN ELECTRIC MOTOR THAT DRIVES A HYDRAULIC PUMP IN A DEMOLITION ROBOT

(71) Applicant: BROKK AB, Skellefteå (SE)

(72) Inventor: Gunnar Bystedt, Skellefteå (SE)

(73) Assignee: BROKK AKTIEBOLAG, Skellefteå (SE)

( * ) Notice: Subject to any disclaimer, the term of this patent is extended or adjusted under 35 U.S.C. 154(b) by 274 days.

(21) Appl. No.: 16/338,178

(22) PCT Filed: Sep. 25, 2017

(86) PCT No.: PCT/SE2017/050927
§ 371 (c)(1),
(2) Date: Mar. 29, 2019

(87) PCT Pub. No.: WO2018/063058
PCT Pub. Date: Apr. 5, 2018

(65) Prior Publication Data
US 2020/0023740 A1      Jan. 23, 2020

(30) Foreign Application Priority Data

Sep. 29, 2016 (SE) .................................... 1651282-4

(51) Int. Cl.
*B60L 1/00*      (2006.01)
*B60L 50/52*     (2019.01)
(Continued)

(52) U.S. Cl.
CPC .............. *B60L 1/003* (2013.01); *B60L 50/52* (2019.02); *B60L 50/53* (2019.02); *E02F 9/205* (2013.01);
(Continued)

(58) Field of Classification Search
CPC .......... B60L 1/003; B60L 50/52; B60L 50/53; B60L 2200/40; E02F 9/205; E02F 9/2091; E02F 9/22; Y02T 10/70
See application file for complete search history.

(56) References Cited

U.S. PATENT DOCUMENTS 9,437,058 B2 * 9/2016 Luke .......................... B60L 1/02
2009/0033148 A1   2/2009 Hoff et al.

FOREIGN PATENT DOCUMENTS

EP       2180576 B1 * 8/2015 .............. B60L 50/53
WO    2008/130968 A1    10/2008
(Continued)

OTHER PUBLICATIONS

International Search Report for PCT Application No. PCT/SE2017/050927, dated Nov. 23, 2017 in 3 pages.

*Primary Examiner* — James M McPherson
*Assistant Examiner* — Kyle J Kingsland
(74) *Attorney, Agent, or Firm* — Knobbe, Martens, Olson & Bear, LLP

(57) ABSTRACT

A power supply system can be used for an electric motor that drives a hydraulic pump in a demolition robot. The system provides a DC current from a source of power, controls and monitors the voltage level (VDCnom) of the DC current, can be activated, and supplies a pre-determined load current ($I_L$) from the source of power to the electric motor. In order to offer improved operational availability and flexibility, the load current ($I_L$) can be constituted by a DC current, and the electric motor can be a DC motor.

6 Claims, 2 Drawing Sheets

(51) Int. Cl.
*B60L 50/53* (2019.01)
*E02F 9/20* (2006.01)
*E02F 9/22* (2006.01)

(52) U.S. Cl.
CPC .............. *E02F 9/2091* (2013.01); *E02F 9/22* (2013.01); *B60L 2200/40* (2013.01)

(56) References Cited

FOREIGN PATENT DOCUMENTS

| WO | WO-2011080392 A1 * | 7/2011 | ................ B60L 9/18 |
| WO | 2013/162448 A1 | 10/2013 | |
| WO | 2014/027246 A2 | 2/2014 | |

* cited by examiner

SYSTEM AND ARRANGEMENT AT AN ELECTRIC MOTOR THAT DRIVES A HYDRAULIC PUMP IN A DEMOLITION ROBOT

CROSS-REFERENCE TO RELATED APPLICATIONS

This application is the U.S. National Phase under 35. U.S.C. § 371 of International Application PCT/SE2017/050927, filed Sep. 25, 2017, which claims priority to Swedish Patent Application No. 1651282-4, filed Sep. 29, 2016. The disclosures of the above-described applications are hereby incorporated by reference in their entirety.

FIELD OF THE INVENTION

The present invention concerns a power supply for an electric motor that drives a hydraulic pump in a demolition robot according to the introduction to claim 1. The invention concerns also a method for the dynamic control of an electric motor that drives a hydraulic pump in a demolition robot according to the introduction to claim 11.

BACKGROUND OF THE INVENTION

Remote-controlled mobile electrically driven demolition robots are used during the dismantling and demolition of buildings and technical facilities, not only outdoors but also indoors. An operator walks beside the demolition robot and controls it remotely by means of a control unit that is supported on the body of the operator by a harness or similar. Also distant remote control through a camera is used. Common demolition robots of the present type are marketed under the trademark "BROKK®". The name has been derived from the small but strong dwarf who, according to Nordic mythology, cast the hammer of Thor, the god of thunder. As a consequence of its small size, with low assembled dimensions and low weight, which amounts to approximately 500 kilograms for the smaller models, the demolition robot is suitable not only to be displaced and to carry out work on floors inside buildings where space is limited, but also to be transported upwards and downwards between floors in a building by means of the existing lifts. In contrast to similar heavier working machines, demolition robots are intended to work on floors inside properties, such as to demolish staircases in shopping centres, and to remove floors in hotel rooms. They are, however, also used in other, more industry-related, contexts.

The work is carried out through a combination of various operations such as the crushing or hacking up of concrete, the cutting of steel reinforcement members, and the removal of building debris created. The demolition robot has a lower part that can be driven and an upper part that can be rotated in the horizontal plane on this lower part, with a manoeuvrable arm that can support at its free end different types of tool that can be exchanged, which tools can demonstrate different types of hydraulically driven work units such as a hydraulic cylinder or a hydraulic motor with different requirements for input power, i.e. the rated power of the work unit based on the oil pressure and rate of flow. The various tools used include, for example, chipping hammers, scissors, grippers, cutters, multigrippers, buckets, drills, and saws. Of these, the chipping hammer is clearly the most commonly used and in addition, it is also the most energy-demanding.

Prior art demolition robots are supplied with power through a cable that is connected to a fixed electrical power grid, through, for example, the electrical sockets in a property, which cable the demolition robot pulls or drags along behind it as it travels. Thus the demolition robot is bound to the electrical power grid through the said cable. The drive system of the demolition robot includes an electric motor that, coupled with a hydraulic pump, converts the electrical energy to hydraulic energy that, in the form of a pressurised hydraulic medium, is distributed to the various work units or operating units of the demolition robot.

Heavy and dangerous work can, thanks to this type of demolition robot, be avoided while the operator can be located at a safe distance from the working area. The term "robot" is here used to denote an electromechanical machine that can be driven and that can carry out physical work operations. The term "mobile" is here used to denote an electromechanical machine equipped with a drive unit, with which it can be displaced. The term "hybrid" is in this case used to denote an electromechanical machine with two or more drive and traction systems, which machine can use more than one driving source or power source, and where these can function independently of each other or may be used in an additive manner in combination with each other. The term "dynamic" is used to denote a system that can work in a manner that uses feedback, and that can be adapted according to requirements.

A demolition robot is designed to use a specific nominal power, known as its "rated power". The term "nominal power" is used to denote the developed power at which it is intended to work under normal operating or loading conditions. In order to avoid overload (overheating), the power supply systems that are used with demolition robots are normally somewhat overdimensioned. It should, however, be understood that the instantaneous requirement for power of a demolition robot can vary considerably, depending on the type of work that the demolition robot is performing. During the breaking of concrete with a chipping hammer the requirement for power is very large, while displacement of the demolition robot results in a relatively low requirement for power.

A further fundamental requirement is that the demolition robot can demonstrate high efficiency and degree of use. In this respect, it is important that the demolition robot can, de facto, be taken into operation on site. In certain cases, the problem arises that the current site does not have available a fixed AC power grid whose electrical sockets can provide a nominal power that is required for the demolition robot. This means, in practice, that the AC power grid cannot supply the current that the electric motor of the demolition robot requires. This may be particularly the case during the instant of starting, when the initial current can significantly exceed the nominal current rating of normal operation. In certain cases the site can provide the required grid voltage, for example 400 V, but cannot deliver the current that the motor requires in order to function at full power. In such cases, the site cannot, of course, provide the current required to start the motor. This condition is known as "power deficiency" and can arise when the available electricity distribution grid at the site can supply, for example, only a main fuse rating of 16 A while the motor of the demolition robot requires a higher fuse rating, for example 32 A, in order for it to be possible to start and operate it. Thus, starting to use the demolition robot is considerably delayed or made more difficult, or in the worst case made impossible, in those cases in which the electricity distribution grid at the site cannot supply the current that the motor requires.

Furthermore, it is necessary in certain cases to displace or manoeuvre the demolition robot without a current cable being connected, for example to carry out short displacements of the demolition robot even if it is not connected to a fixed AC power grid. This may typically be a case of displacement or manoeuvring of the demolition robot on sites on which it is impractical for a current cable to be used or where electrical sockets from the AC grid are lacking. In certain cases it may be a case of transport of the demolition robot in a lift car between floors in a building where the need arises to displace or manoeuvre the demolition robot when it is located inside the lift car, or the need to rapidly displace the demolition robot a short distance, for example during loading or unloading into or out of a lift car, or to load or unload the demolition robot from a transport vehicle at a workplace, or to drive the demolition robot to a nearby electrical socket at the present location in order to carry out work.

A power supply system for a demolition robot is described in WO2013/162448 A1 that allows operation with a combination of a primary and a secondary source of power. The primary source of power is constituted by an AC electricity supply grid from a power grid, while the second source of power is constituted by a battery or similar that is integrated with the demolition robot and supported onboard it. The system is based on a DC bus. The two sources of power are intended to be used individually or in combination. The power supply system includes an AC drive motor that drives a hydraulic pump. The AC drive motor is connected to the DC bus through an inverted rectifier.

A similar power supply system is known from WO 2011/080392 A1. In contrast to the power supply described above, this system is intended to be used in mining vehicles. Components of the power supply system include a DC bus, an AC drive motor, an inverted rectifier and an internal battery. The primary source of power includes an AC power grid from a conventional power grid that is connected to the DC bus through a rectifier. The battery can serve as an additional supply of power when necessary.

A power supply system for a working machine that has a primary and a secondary source of energy is known from EP 2 180 576 A2. The power supply system demonstrates the absence of a DC bus, but has a current breaker or switch with which the working machine is alternatively connected for operation from an AC power grid or a battery. The system comprises an AC motor that is driven by battery power through an inverted rectifier.

Common to all of the prior art power supply systems described above is that they use AC motors in combination with inverted rectifiers for the conversion of the direct current of the DC bus to alternating current for the AC motor. It may be a case of, for example, three-phase AC motors of low-voltage type with a rated voltage of 380-500 V and a frequency of 50 or 60 Hz. One disadvantage of AC motors is that they are normally intended to be driven at constant speed; they require a large starting current; and they demonstrate relatively high weight. The starting current may be 2-11 times the rated current, which places very high demands for high power availability, in particular at the instant of starting. The high requirement for power during start results in a need to select a secondary source of power, which provides reserve power, and which may be a battery, with a significant capacity.

Furthermore, it should be understood that the instantaneous requirement for power of a demolition robot varies, and in some cases may amount to only approximately 30% of the rated power. This large over dimensioning gives rise to disadvantageous effects for the efficiency of the demolition robot, and is expensive. One further problem with prior art technology is the extra weight, cost and space required at the working machine that the secondary source of power (the battery) and the inverted rectifier or DC/AC converter, which are necessary in order to provide the AC motor with the required alternating voltage from the DC bus, require.

SUMMARY OF THE INVENTION

One purpose of the present invention is, therefore, to achieve a power supply system for an electric motor that drives a hydraulic pump in a demolition robot that solves the problems specified above.

In particular, it is aspired to achieve a power supply system that can offer considerably improved operational availability and flexibility, and that makes it possible on every occasion at least to start and drive a demolition robot, also in cases in which the required AC power grid is not available at the site. Furthermore, it is aspired to achieve a power supply system that makes it possible to control in a dynamic manner the nominal power requirement of the demolition robot such that it can be adapted on any occasion to the requirement for power that instantaneously arises, which requirement may vary depending on the load conditions prevalent at the site. If the demolition robot is working with a chipping hammer, a significant instantaneous requirement for power arises, while in cases in which the demolition robot is being displaced in what is known as "transport mode" between different sites, the instantaneous requirement for power is relatively low. The possibility of being able to adapt or optimise the requirement for power to any particular occasion by dynamic control should be able to contribute to considerably improved operational availability and flexibility.

It is furthermore desirable that the power supply system be lightweight and compact. The term "lightweight" is used to denote the fact that the power supply system does not add unnecessary weight to the demolition robot or contribute to unnecessarily increasing its external dimensions, and in this way making it less suitable for its particular operations.

It is desirable that the demolition robot can be displaced or manoeuvred at least temporarily, without the need for a current cable to be connected or an AC power grid to be available at the site. Furthermore, it is aspired to achieve a method for the dynamic control of an electric motor that drives a hydraulic pump in the power supply system of a demolition robot, and that offers improved energy use and makes it possible to use the drive motor of the demolition robot more efficiently.

These aims of the invention are achieved through a power supply system for an electric motor that drives a hydraulic pump in a demolition robot and that demonstrates the distinctive features and characteristics that are specified in claim 1, and a method for the dynamic control of an electric motor that drives a hydraulic pump in a demolition robot according to the dimensions and steps that are specified in claim 11.

The insight that forms the basis of the invention consists of choosing a DC motor as electric motor in the system. A DC motor has the advantage that it is particularly suitable for power control. The DC motor has several advantages over the AC motor: The DC motor is compact: it has a higher power/weight ratio, and a higher power/size ratio. The efficiency is an excellent 95-98%: the DC motor has a lower starting torque, and its power output can be easily controlled through current regulation. The DC motor can be gently started through gradual increase of the power, in a process known as "PWM control" (where "PWM" is an abbreviation for "pulse width modulation"). While it is true that a lower armature current means that the speed is lower, even in cases in which the AC power grid at the site can deliver only a limited current and in this way a limited power, it will in most cases be possible for the demolition robot to be started and driven. In one design, the DC motor may include a brushless direct current motor with electronic commutation, known as a "BLDC" motor. These brushless machines are highly suitable to be driven from a DC bus with nominal circuit voltage. A further advantage of the DC motor is that it can be driven directly from a DC bus, whereby there is no longer any need for an onboard inverted rectifier or DC/AC converter. Consequently, a significant saving in weight and space can be achieved.

One hybrid aspect of the invention in this case lies in achieving a power supply system in which it is not necessary to characterise the sources of energy as "primary" or "secondary": rather a system in which each source of power, independently of its capacity, can be used as a potential source of power in order to drive the electric motor and hydraulic pump of the demolition robot. This will be possible since the power supply system makes it possible to adapt, through dynamic control of the power, the nominal requirement for power of the demolition robot, by, for example, assigning it a pre-determined reduced load current $I_L$ that corresponds to the current or instantaneous requirement.

Since the power output from the DC motor can be easily controlled, i.e. reset for operation at a lower power through regulation of the armature current supplied to the motor, in a process known as "current regulation", the DC motor can be adapted to any requirement. It can, for example, be adapted to be used solely as traction motor, and to allow displacement of the demolition robot in what is known as "transport mode". It should be understood that the armature current in a DC motor is directly proportional to the force that turns the rotor. With the power of the DC motor reduced, the limited capacity of the integral battery is normally sufficient as sole source of energy, even when it is a matter of what is, from the point of view of capacity, a relatively small integral battery with limited capacity, since in this case it needs to supply only some of the working components, which require less power, of the demolition robot.

In a further embodiment, a connector unit that is a component of the power supply system may be equipped with a DC port or similar connector unit that permits an external battery to be connected through, for example, a cable. The term "external" is used to denote the fact that the battery is located at a distance, and is not normally supported onboard the demolition robot.

In certain cases, an internal integral battery or an external battery may be chosen with such a capacity that it is capable of driving the motor of the demolition robot as its sole source of energy without any noteworthy need to regulate downwards the power of the DC motor for operation at a reduced power: the battery has the capacity to drive also a chipping hammer, which requires significant power, at least for a limited period.

BRIEF DESCRIPTION OF THE DRAWINGS

An embodiment of the invention will be described below in more detail with reference to the attached drawings, of which.

DETAILED DESCRIPTION OF THE PREFERRED EMBODIMENTS

Figure 1:
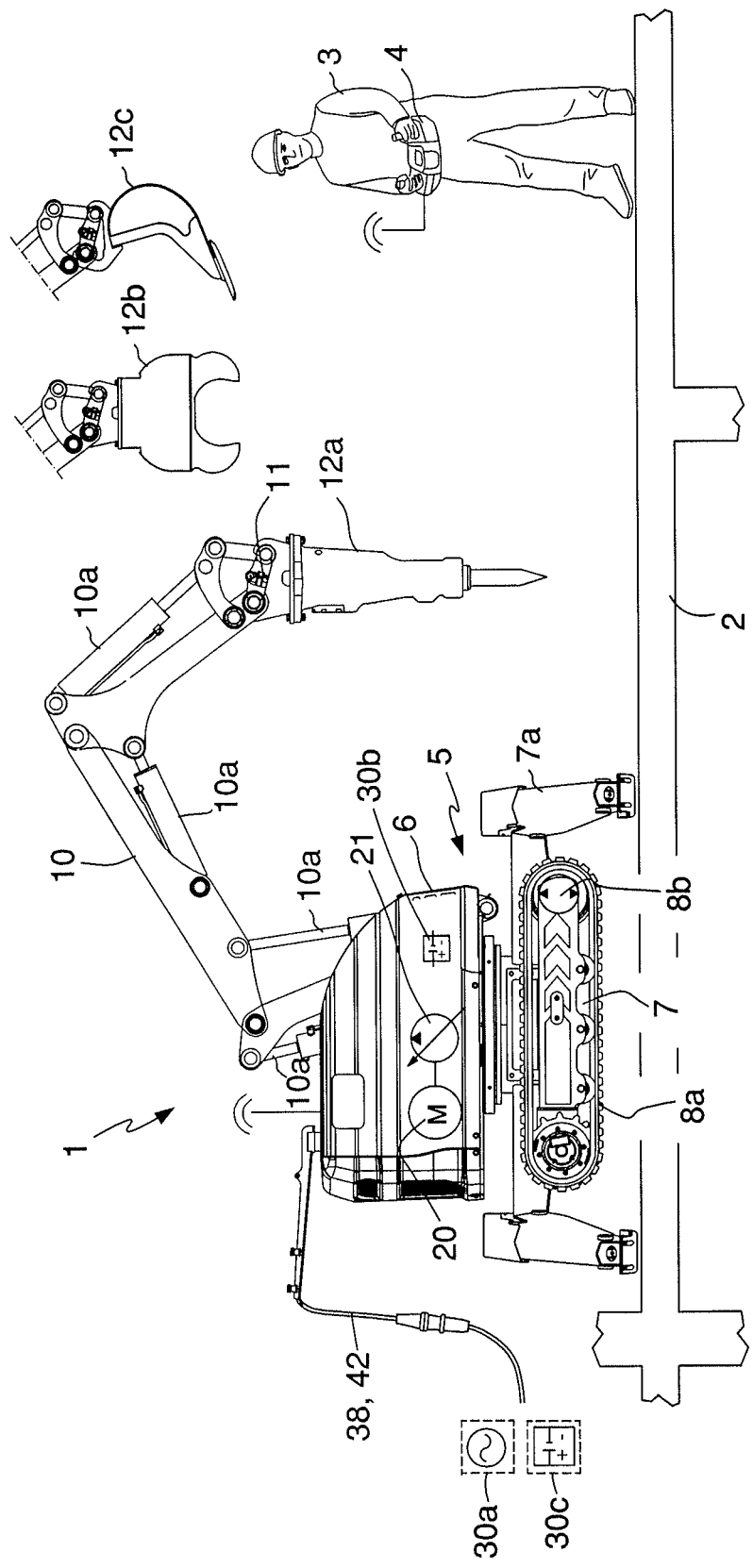
FIG. 1 shows a side view of a demolition robot equipped with a power supply system according to the invention.

FIG. 1 shows a mobile electrically driven demolition robot 1, equipped with a power supply system according to the invention. In order to illustrate in more detail how this type of demolition robot is used, it is shown in a common situation in which it is working standing on a floor 2 inside in a building. The demolition robot 1 is controlled and operated by an operator 3. The operator 3 walks next to the demolition robot and controls it remotely through a radio link by means of a portable control unit 4 or remote-control unit. The operator 3 can in this way be located at all times at a safe distance from the working area of the demolition robot.

The demolition robot 1 generally includes a carriage 5 with an upper part 6 and a lower part 7. The upper part 6 is mounted in bearings on the lower part 7 such that it can be rotated in a horizontal plane around a vertical axis. Rotation takes place by means of a hydraulic motor not shown in the drawings. The lower part 7 of the carriage is provided with a propulsion means that includes continuous tracks 8a. The continuous tracks 8a are driven by hydraulic motors 8b. Reference number 7a denotes a support leg, and reference number 10 denotes a manoeuvrable arm that is supported at the upper part 6 and can be manoeuvred by means of hydraulic cylinders 10a. The manoeuvrable arm 10 is equipped at its free end with a tool mounting 11 to which different types of tool can be mounted in a manner that allows them to be removed, and connected for hydraulic operation. The demolition robot 1 is shown in FIG. 1 equipped with a chipping hammer 12a at the said tool mounting 11. Several other types of tool can be mounted at the tool mounting 11, for example scissors 12b or a bucket 12c for the execution of other operations. The instantaneous requirement for power of the demolition robot 1 can vary considerably depending on which hydraulically driven work unit that is a component of the demolition robot, such as a hydraulic cylinder or a hydraulic motor, is to be supplied with the required input power (oil pressure and rate of flow).

Figure 2:
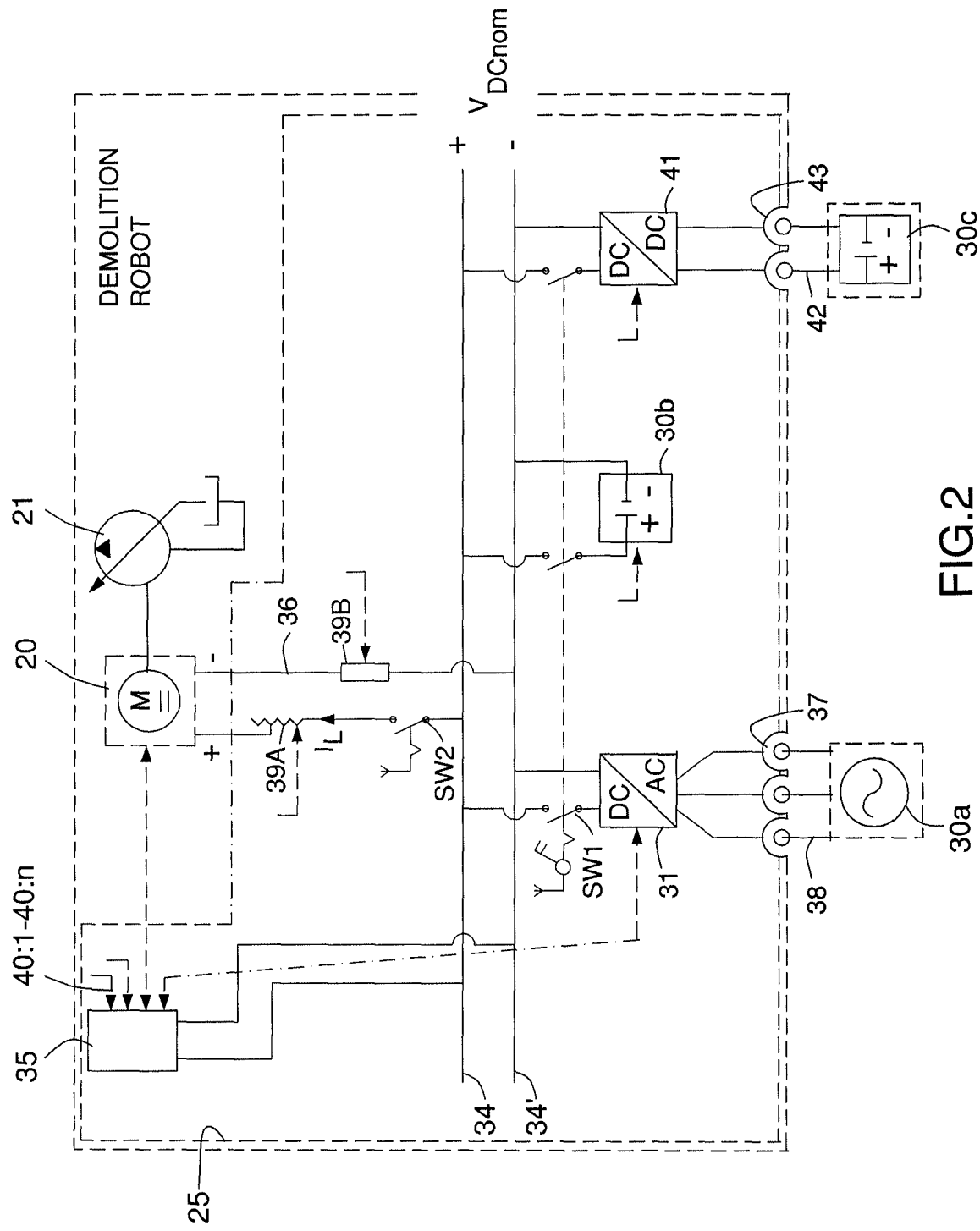
FIG. 2 shows schematically a block diagram of a power supply system according to the invention for an electric DC motor that drives a hydraulic pump in a demolition robot, which system can be adapted for hybrid operation and for allowing a single or several internal (integral) or external sources of power to be used either individually or in combination.

FIG. 2 shows a power supply system according to the invention. It will be made apparent below that the present power supply system can, but does not necessarily need to be, adapted for hybrid operation. The power supply system comprises an electric DC motor 20 that drives a hydraulic pump 21 with which the various working units and operating units of the demolition robot 1, such as, for example, the hydraulic motors 8b of the continuous track 8a and the hydraulic cylinders 10a of the manoeuvrable arm 10, together with externally connected tools 12a-12c, can be driven through being supplied with a flow of hydraulic medium. During displacement of the demolition robot 1 forwards or backwards there is supplied, through hydraulic valves not shown in the drawing, a flow of hydraulic fluid to the said hydraulic motors 8b in order to drive the continuous track 8a. The DC motor 20 is in this case used, through the hydraulic pump 21, in principle exclusively as a traction motor for the demolition robot 1.

The power supply system comprises a connector unit 25 that is supported onboard the demolition robot 1 and that makes it possible to use, either individually or in combination, a first source of power 30*a*, a second source of power 30*b*, and/or a third source of power 30*c*.

In the embodiment shown, the first source of power 30*a* may comprise a three-phase AC power grid in a building with, for example, a rated voltage of 400 V and a frequency of 50 Hz. The said second source of power 30*b* may comprise an internal battery that, supported onboard the demolition robot 1, forms an integral or integrated part of it. The third source of power 30*c* may comprise an external battery that may be located at a distance from the demolition robot. Even if the expression "battery" is used, it should be understood that not only the said second source of power 30*b* but also the said third source of power 30*c* may be selected from among any known type of energy source that can store energy and deliver the energy in electrical form when required. In this respect, also what is known as a "supercondensor" may be considered to be a battery. The stored energy can appear in any suitable form, for example as chemical energy (an energy cell) stored in a certain substance, electrical energy or kinetic energy.

The connector unit 25 comprises the following principal components: a rectifier 31 to convert alternating current that is obtained from a first source of power 30*a*, i.e. an AC power grid, to direct current, a means to provide DC current from a source of power 30*a*, 30*b*, 30*c* in the form of an intermediate circuit or DC bus 34, 34' with two parallel conductors in the form of a positive side and a negative side that demonstrate between them a pre-determined nominal direct voltage $V_{DCnom}$, and a second source of power 30*b* that in one execution of the invention may include a "mini-battery". Such a minibattery may be chosen with such a limited capacity and with such limited external dimensions that it can, without any problems worthy of mention and without contributing weight, be placed in a power supply system onboard the demolition robot. The minibattery can be charged by an excess of power that arises when, for example, a first source of power 30*a* with the required capacity is connected. Due to the DC bus 34, 34', there is offered the possibility of automating in a simple manner the connection and disconnection of a minibattery through measurement of the instantaneous voltage state, $V_{DCnom}$, of the DC bus in order to check whether a power surplus is present. In a situation in which a power deficiency is prevalent, a minibattery can be connected and used as supplementary or back-up power, or conversely, in a situation of power surplus, for example in the case in which the first source of power 30*a* can deliver the required power, a minibattery can be charged.

The reference number 36 denotes a bipolar cable for the transfer of direct current from the DC bus 34, 34' to the DC motor 20, which is thus connected in parallel to the DC bus. The means SW1 denotes a mains switch with an On/Off switch that can be operated by an operator 3 by, for example, turning a key in order to switch the system between an active state and a passive state in which the means 34, 34' of supplying DC current, i.e. the DC bus, does not receive any power from any of the said sources of power 30*a*, 30*b*, 30*c*. The means SW2 denotes an operating switch with an On/Off switch that can be operated by an operator 3 through, for example, pressing a button, whereby in the passive state the DC motor 20 does not receive any power from the means 34, 34' of providing DC current. It can be mentioned that it is appropriate that each one of the said mains switch SW1 and the operating switch SW2 be arranged to be influenced by remote control through, for example, a setting means on a control unit 4 intended to be carried by an operator 3 of the demolition robot 1.

Reference number 37 denotes a three-phase AC port that is a component of the connector unit 25 and that allows the connection and transfer of three-phase AC grid voltage through a cable 38 from the primary source of power 30*a* to the DC bus 34, 34'. A control circuit 35 that is a component of the connector unit 25 forms a means to control and monitor the voltage levels $V_{DCnom}$ that arise in the system. The power to and from the relevant units that are connected to the DC bus 34, 34' is controlled and monitored by means of a control system that is a component of the control circuit 35, for example a programme logical control circuit known as a "PLC", or a computer that is connected through electrical connections 40:1-40:*n* with the said units that are connected to the DC bus. The control circuit 35 may be associated also with means in the form of what is known as a "motor control means" or similar in order to control the power of the DC motor 20 through a power output 39A that can be regulated. This is, in practice, a current regulation that may in its simplest form include variable resistor elements but that normally includes some type of electronic regulator and MOSFET with a converter for measured values that are fed back, that allows the rate of revolution to be adapted or held constant when variations in load arise. The power output 39A that can be regulated feeds the DC motor 20 by providing a voltage with pre-determined magnitudes of voltage and current with values V and A.

The connector unit 25 can comprise a bipolar DC port 43 that allows an external third source of power 30*c* to be connected to the DC bus 34, 34'. The connection of the third source of power 30*c* to the DC bus 34, 34' can take place through a cable 42. The third source of power 30*c* may be connected directly to the DC bus 34, 34', but it is preferable that it is connected, as shown in the drawing, through a DC/DC converter 41 whose task is to adapt when required the voltage at the third source of power 30*c* to the nominal voltage of the DC bus. The said DC/DC converter 41 is in certain cases connected with the control system of the control circuit 35 through any one of the said electrical connections 40:1-40:*n* of the control circuit 35.

In order to achieve change in the rate of revolution, the motor current $I_L$ through the DC motor 20 may be regulated on the basis of an appropriate control signal to the motor control unit and the associated regulatable power output 39A. Monitoring and control can be carried out manually by the operator 3 through the influence of control means, i.e. switches or buttons on the control unit 4, or it may take place automatically through a current sensor 39B that can be influenced by the hydraulic pressure prevalent in the system. It is appropriate that the said manual setting take place by the operator 3 through reprogramming the control circuit 35 through accessing through the control unit appropriate dialogue-controlled menus in the programmable logical control circuit of the system, what is known as the "PLC" or computer.

Such a current sensor may comprise a resistor with which a load current $I_L$ and voltage can be measured. The resulting measurement results can be transferred to the control circuit 35, which ensures that a load current $I_L$ with a pre-determined magnitude is delivered from the means 34, 34' of providing current to the DC motor 20. If the load current $I_L$ exceeds a pre-determined threshold, the DC motor can be deactivated through the control circuit 35 opening the mains switch SW1 to all sources of power 30a, 30b, 30c in order to avoid overheating or damage to the DC motor.

It is conceivable that the remote-control unit 4 that is supported by the operator 3 can include suitable signal sensors that can give rise to, either through setting or selection by the operator, a control signal for a motor control unit in order to generate a pre-determined target value for the power control of the DC direct current motor. It is appropriate that the power regulation of the DC motor take place through a semiconductor bridge circuit with electronic switching elements or through pulse width modulation through what is known as "PWM control" (where "PWM" is an abbreviation for "pulse width modulation"), whereby the current pulses are broken up into pacing pulses. Such power regulation by PWM is very common in the power regulation of DC motors. The DC motor is in this case driven by a chain of pulses generated in the control unit for the motor control unit, which means that the DC motor is placed under voltage during the phases of the pulse chain that are subject to a positive voltage, while it is free of voltage during the phases of the pulse chain that are free of voltage. All of the units mentioned here are, as such, well known within the field of electrotechnology and are all commercially available, and thus their design and function will not be described in more detail.

Due to the DC bus 34, 34', it is possible to use the first source of power 30a, the second source of power 30b and the third source of power 30c either in combination or individually. Thus, with the aid of the control circuit 35 it is possible to connect or disconnect the said first, second and third sources of power 30a, 30b 30c in a freely chosen manner. In this respect it should by understood that it is possible, due to the DC bus 34, 34', that the power supply system according to the invention can function when required separately with any one of the said first, second and third sources of power 30a, 30b, 30c.

As has been mentioned above, the first source of power 30a, the second source of power 30b and the third source of power 30c can be used in combination or separately. Consequently, it is not necessary that the present power supply system be designed for the hybrid operation of a demolition robot: it could, as an alternative, be so designed that it is normally only intended to use one of the said first source of power 30a, second source of power 30b and third source of power 30c.

In one design, a power supply system according to the invention may be so designed that it comprises solely the first source of power 30a, whereby the demolition robot 1 is intended to be supplied by current exclusively through a cable 38 that the demolition robot pulls along behind itself. The cable may be connected to a fixed electrical three-phase AC supply grid through, for example, an electrical socket in a building.

In another design, a power supply system according to the invention may be so designed that it comprises solely the second source of power 30b, whereby the demolition robot 1 is intended for exclusively battery-powered operation with an integral battery. In this case, it is, of course, necessary that the battery be dimensioned such that it is able to store sufficient energy that it can correspond to the nominal requirement for power of the demolition robot during a period of pre-determined length.

The power supply system described above for an electric DC motor 20 that drives a hydraulic pump 21 in a demolition robot 1 functions in the following manner:

In the case in which the demolition robot 1 is intended to be taken into use at a site that has an AC power grid with limited power, the nominal power requirement of the DC motor can be reduced by power control by means of the regulatable power outlet 39A. The requirement for power for the DC motor is in this way adapted to the available power of the AC power grid, such that the demolition robot can be started. In cases in which the demolition robot 1 must be driven at "full" power, i.e. when it must be able to deliver the rated power in order to, for example, drive a chipping hammer, a second source of power 30b and/or a third source of power 30c can be used, in cases in which the power supply system is designed for hybrid operation, in combination with a first source of power 30a in order to provide the required power together.

Due to the DC motor 20, the nominal requirement for power of the demolition robot 1 can be regulated and adapted through the DC motor being supplied with a DC load current $I_L$, such that it corresponds to the power that any one of the said first 30a, second 30b or third sources of power 30c can deliver. In this respect it should be understood that the power of the DC motor 20 can, of course, be controlled such that it corresponds also to any requirement for power that has been determined in advance. The load current $I_L$ can be chosen with respect to a pre-determined rate of flow of oil or power from the hydraulic pump 21, or an instantaneous capacity requirement for a rate of flow from the hydraulic pump 21. The load current $I_L$ that is supplied to the DC motor 20 can be regulated by a power regulator 39A arranged between the DC motor 20 and means 34, 34' that supplies DC current.

Through control of the power of the DC motor 20, the available operating time for either of the said second or third sources of power 30b can be extended or adapted such that it corresponds to any instantaneous desired requirement for power. In some case, it should be possible to reduce the power of the DC motor 20 to a condition in which it is exclusively intended to be used as traction motor for displacement of the demolition robot. The requirement for power will in this case become minimal.

Also the inverse is, of course, possible, i.e. a maximal increase in power by means of the regulatable power output 39A of the DC bus 34, 34', for the case in which the availability of energy from the said first source of power 30a, second source of power 30b or third source of power 30c, either individually or in combination, is very good or in practice unlimited. By setting the regulatable power output 39A in a condition of maximal power with adjustment of the nominal load current $I_L$ upwards to a maximum value, it becomes possible for the demolition robot to, at least for a limited period, in something that can be most accurately described as an abnormal operating condition, support a tool, for example a chipping hammer, that is, to a certain extent, over dimensioned and that actually requires a somewhat higher rated power than the nominal power of the demolition robot or the power that the demolition robot is intended to deliver during normal operation.

The present invention is not limited to that which has been described above and shown in the drawings: it can be changed and modified in several different ways within the scope of the innovative concept defined by the attached patent claims.

What is claimed is:

1. A power supply system for an electric motor that drives a hydraulic pump in a demolition robot, comprising:
    a source of power providing a DC current,
    a control circuit configured to control and monitor a voltage level (VDCnom) of a DC bus,
    a system activator, a power supply configured to supply a pre-determined load current ($I_L$) from the source of power that provides current to the electric motor, wherein the load current ($I_L$) is a direct current (DC) and the electric motor comprises a DC motor, wherein the source of power comprises a plurality of power sources including:

a fixed AC power grid, and at least one selected from a group consisting of an internal battery supported onboard the demolition robot, and an external battery located outside of the demolition robot, wherein the system activator to activate the system comprises:

a mains switch with an On/Off switch that is operable by an operator by turning a key in order to switch the system between an active state, in which the system activator is configured to supply power from one or more of the plurality of power sources to the DC bus, and a passive state, in which the system activator is configured to not supply the power from the plurality of power sources to the DC bus, an operating switch with an On/Off switch that is operable by an operator through pressing a button, whereby in a passive state the DC motor does not receive any power from the DC bus for providing DC current, and a power regulator that is arranged between the DC motor and the DC bus that provides DC current and, through the influence of which power regulator, the magnitude of the load current ($I_L$) that is supplied to the DC motor can be regulated, wherein the power supply system further comprising, a portable controller intended to be carried by an operator for remote control of the demolition robot, wherein monitoring and control of the power regulator can take place manually by an operator of the demolition robot setting means on the portable controller, or automatically through the influence of a current sensor arranged at the power regulator or a corresponding electronic regulator that is connected in a manner that transfers signals, and is thus capable of providing feedback, with the power supply for supplying load current.

2. The power supply system according to claim 1, comprising a connector in which the source of power, the control circuit, and the power supply are included, wherein the connector constitutes an integral part of the demolition robot and is supported on it.

3. The power supply system according to claim 2, wherein the connector comprises one or several members from a group consisting of: an AC port and an AC/DC converter that allows a fixed AC power grid to be connected through an electrical cable to the source of power, an internal battery integral to the demolition robot that is directly connected to the source of power, a DC port that allows an external battery located at a distance from the demolition robot to be connected through electrical cable to the source of power.

4. The power supply system according to claim 3, wherein either one or each of the said mains switch and operating switch is arranged for influence by the portable controller.

5. The power supply system according to claim 1, wherein the source of power comprises a DC bus.

6. The power supply system according to claim 1, whereby the DC motor comprises a brushless direct current motor with electronic commutation, known as a "BLDC" motor.

* * * * *